United States Patent
Saari et al.

(10) Patent No.: US 6,909,254 B2
(45) Date of Patent: Jun. 21, 2005

(54) DECELERATION DURING MAINS BREAK

(75) Inventors: Heikki Saari, Espoo (FI); Osmo Pasuri, Ojakkala (FI); Aarne Mielonen, Kerava (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/480,935

(22) PCT Filed: Jul. 1, 2002

(86) PCT No.: PCT/FI02/00588

§ 371 (c)(1),
(2), (4) Date: Dec. 16, 2003

(87) PCT Pub. No.: WO03/003558

PCT Pub. Date: Jan. 9, 2003

(65) Prior Publication Data

US 2004/0150925 A1 Aug. 5, 2004

(30) Foreign Application Priority Data

Jun. 29, 2001 (FI) .............................. 20011410

(51) Int. Cl.⁷ ................................................ H02D 7/00
(52) U.S. Cl. ........................ 318/432; 318/433; 318/434
(58) Field of Search .......................... 318/432, 39, 433, 318/434, 727, 779, 34, 757

(56) References Cited

U.S. PATENT DOCUMENTS

| | | | |
|---|---|---|---|
| 5,196,769 A | 3/1993 | Chiba et al. ................... | 318/39 |
| 2003/0182042 A1 * | 9/2003 | Watson et al. ................. | 701/45 |
| 2003/0196647 A1 * | 10/2003 | Christner et al. ........... | 123/672 |

FOREIGN PATENT DOCUMENTS

| | | |
|---|---|---|
| JP | 2000 152693 | 10/2000 |
| WO | 97/02650 | 1/1997 |

\* cited by examiner

*Primary Examiner*—Karen Masih
(74) *Attorney, Agent, or Firm*—DykemaGossett PLLC

(57) ABSTRACT

A method and an arrangement for stopping sectional drive controllably in connection with a fault situation in the supplying mains, the sectional drive comprising a plurality of inverters (4) which are supplied by a DC intermediate circuit (3) supplied by the mains (1), a plurality of electric motors (5) which are controlled by inverters with speed and/or torque control and which are used for implementing speed and tightness reference values of the strip in the sectional drive system, the tightness reference value being predetermined motor-specifically or motor-group-specifically. Prior to stopping the sectional drive, the method comprises the implementing step of predetermining an estimate (T) of the time needed for stopping the motors, whereby the method comprises the steps, in connection with a fault situation, of detecting a fault situation in the supplying mains, forming a deceleration reference value for the motors for stopping the motors within a predetermined time, controlling the speed of the speed-controlled motors in the sectional drive on the basis of the deceleration reference value, controlling the torque of the torque-controlled motors in the sectional drive on the basis of the predetermined tightness reference value, determining the magnitude of the DC voltage intermediate circuit (3) and altering the deceleration reference value on the basis of the magnitude of the DC voltage.

9 Claims, 1 Drawing Sheet

DECELERATION DURING MAINS BREAK

BACKGROUND OF THE INVENTION

The present invention relates to a method and an arrangement for stopping sectional drive controllably in connection with a fault situation in the supplying mains, the sectional drive comprising a plurality of inverters which are supplied by a DC voltage intermediate circuit supplied by the mains, a plurality of electric motors which are controlled by the inverters with speed and/or torque control and which are used for implementing speed and tightness reference values of the strip in the sectional drive, the tightness reference value being predetermined motor-specifically or motor-group-specifically.

Entities comprising a plurality of motors, where motors are used for moving a material strip, are referred to as sectional drive. In sectional drives, a plurality of motors is synchronously controlled in such a way that the strip remains as desired. The properties of the strip in connection with sectional drive include for instance the speed and tightness of the strip. The most typical examples of the sectional drive are, for instance, a paper machine and a metal-processing plant, where the paper web and the metal strip are maintained controllably, driven by a large number of motors.

The most typical way to implement controllable sectional drive is the use of alternating-current motors controlled by an inverter. Inverters allow control of the motor speed and the torque in a reliable manner, whereby the speed and tightness of the material strip can be maintained as desired.

In connection with a metal-processing plant, the problem in the sectional drive is that the process section stops uncontrollably as a result of a fault in the supplying mains, such as a power failure. In a metal-processing plant, a thin metal sheet is processed, which is rolled be as a continuous strip through the process section. As part of the process, metal is heated in a furnace, the length of which is for instance between 50 and 100 meters and the temperature of which is between 700° C. and 1,000° C. Hereby, the composition of the metal strip, the thickness of which may be, for instance, between 0.15 and 10 mm, becomes plastic and thus also easily breakable.

In connection with present-day apparatus, when a sudden and surprising mains break occurs, for instance as a result of lightning, the motors stop uncontrollably, whereby the torques and speeds provided by the motors are not controllable. This leads to a situation where the metal strip breaks into the inside of the furnace. Since a furnace is a large construction, its cooling for cleaning and reheating to the process temperature for the purpose of starting the process takes a considerably long time. The length of a production down time caused by such a process failure may well be 24 hours, whereby the decrease in the production resulting from the down time is economically considerable.

Publication U.S. Pat. No. 5,196,769 discloses deceleration of an individual motor in such a way that its rotating mass is decelerated during a mains break to maintain the synchronism between the motor to be decelerated and the other motors. Said publication thus contains one motor with large inertia, which motor is controlled with speed control, the intention being to limit the speed of the motor in connection with a mains break.

Publication EP 836 764 also relates to limiting the speed during a mains break. In the solution according to the publication, apparatus with greatest mechanical energies are selected beforehand, the other motors being supplied with the energy of these particular apparatus to stop the motors synchronically.

BRIEF DESCRIPTION OF THE INVENTION

An object of the present invention is to provide a method and an arrangement which avoids the above-mentioned drawbacks and enables stopping of a sectional drive system in a reliable manner in such a way that the material strip of the sectional drive meets the tightness requirements set for it during the whole break time. This object is achieved by means of the method according to the invention, which is characterized by the method comprising, before stopping the sectional drive, an implementing step in which an estimate of the time needed for stopping the sectional drive motors is determined, whereby the method comprises, in connection with a fault situation in the mains, the steps of detecting a fault situation in the supplying mains; forming a deceleration reference value for the motors for stopping the motors within a predetermined time; controlling the speed of the speed-controlled sectional drive motors on the basis of the deceleration reference value; controlling the torque of the torque-controlled sectional drive motors on the basis of a predetermined tightness reference value; determining the magnitude of the DC voltage of the DC voltage intermediate circuit; comparing the magnitude of the DC voltage with a predetermined voltage limit; and altering the deceleration reference value on the basis of the magnitude of the DC voltage in such a way that when the determined DC voltage is lower than the voltage limit, the deceleration of the motors is increased, or in such a way that when the DC voltage is higher than the voltage limit, the deceleration is decreased to stop the sectional drive in a controllable manner, maintaining the tightness reference value of the strip.

The method according to the invention is based on the idea that sectional drive is guided to a stop controllably in such a way that during the break the motors are decelerated in such a way that the energy provided by the deceleration is consumed for mechanical and electrical losses. During the deceleration, the motors generate energy through the inverters to the DC voltage intermediate circuit to keep the inverters operational. Keeping up the operationality is a prerequisite for continuous control of the material strip tightness. The DC voltage of the DC voltage intermediate circuit is observed, and in accordance with the magnitude of the DC voltage, the deceleration is increased or decreased.

The method according to the invention allows a large tightness-controlled sectional drive entity comprising dozens of motors to be decelerated and stopped controllably without supply voltage in such a way that the material strip of the sectional drive remains as it is.

Another object of the invention is an arrangement for stopping sectional drive controllably in connection with a fault situation of the supplying mains, the sectional drive comprising a plurality of inverters that receive their supply from a DC voltage intermediate circuit supplied by the mains, a plurality of electric motors that are controlled with inverters in a speed-controlled or torque-controlled manner and that are used for implementing the speed reference value and tightness reference value of the strip of the sectional drive, whereby the tightness reference value is predetermined motor-specifically or motor-group-specifically. The arrangement is characterized in that it comprises means for detecting a fault situation in the mains; first control means for controlling the speed of the speed-controlled motors; second control means for controlling the torque of the torque-controlled motors on the basis of a predetermined tightness reference value; a voltage-measuring member in order to determine the DC voltage of the DC voltage intermediate circuit; tightness-determining means arranged to determine the tightness of the material strip of the sectional drive; and a memory and processing member arranged to store the estimate of the time needed for stopping the motors of the sectional drive, to form a deceleration reference value for the motors for stopping the motors within a predetermined time, to compare the magnitude of the DC voltage with a predetermined voltage limit, and to alter the deceleration reference value, depending on the magnitude of the DC voltage.

The advantages of the invention can be implemented in a simple and reliable manner by means of the arrangement according to the invention.

BRIEF DESCRIPTION OF THE DRAWINGS

The invention will now be described in greater detail in connection with preferred embodiments, with reference to the attached drawing, in which the FIGURE shows a simplified structural view of an apparatus according to the invention.

DETAILED DESCRIPTION OF THE INVENTION

Figure 1:
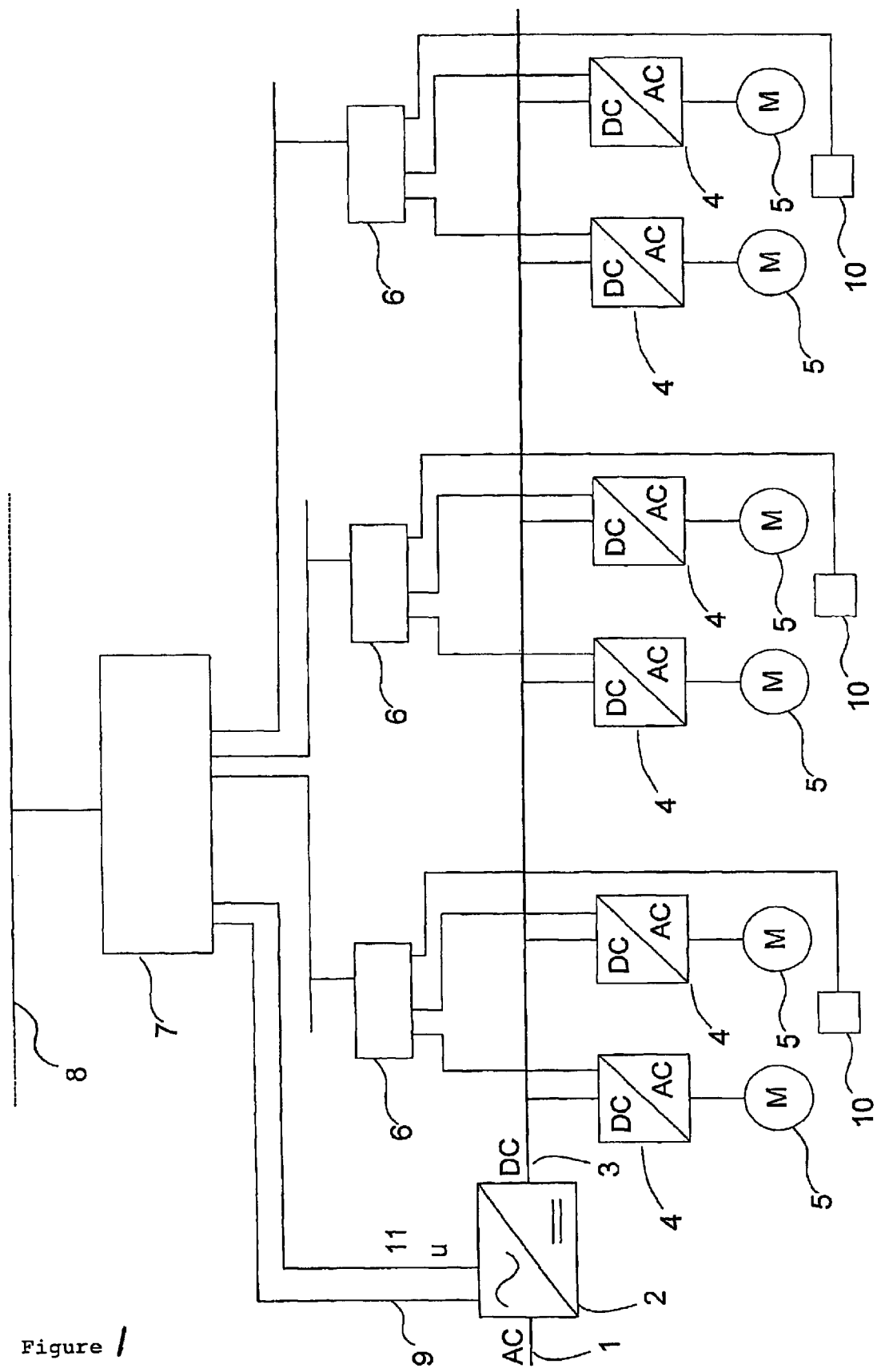

The FIGURE shows a simplified structural embodiment of an apparatus implementing the method according to the invention. The motors of the sectional drive receive their energy from alternating-voltage supply mains 1. The alternating voltage is rectified by means of a rectifier unit 2, which supplies DC voltage to a DC voltage intermediate circuit 3. Typically, the rectifier units are implemented as mains inverters, in which case energy generated in the deceleration of the motors can be supplied through them back to the mains 1.

A plurality of inverter units, i.e. inverters 4, are further connected to the DC voltage intermediate circuit, the inverters generating desired alternating voltage for motors 5 to control them in a desired manner. Present inverters can be used in a plurality of ways by giving them speed, torque or acceleration reference values to serve as their reference value. In the same way as the rectifier unit 2, also the inverters are typically implemented as mains inverters, which allows energy to flow in both directions through the inverter.

The FIGURE further shows control elements, such as application controllers 6 arranged to control the inverters. A plurality of inverters can be connected to one application controller. The application controllers are further connected to a memory and processing member, such as a process station 7, via a field bus, the memory and process member comprising general sequencing and speed reference value chains of the drives. The process station 7 is further connected to the control system of the upper level on a bus 8.

Naturally, several application controllers 6 can be connected to a single field bus. The solution shown in the FIGURE relates to a structure in which the process station 7 comprises a plurality of processors, each of which controls a separate part of the sectional drive. In the present exemplary case, the sectional drive is divided into three parts, i.e. starting part, process part and end part, each of which has a processor and a field bus of its own. The sectional drive is formed of several motors and of inverters arranged to control these. In the FIGURE, only a few of the motors are presented to give examples and for the sake of simplicity.

In accordance with the method of the invention, an estimate or an initial value is experimentally determined for time T required for stopping the motors in such a way that the energy generated by the motors during deceleration is consumed in its entirety in the sectional drive. In connection with a mains break, no energy can be supplied to the mains, so that all of the motion energy bound to the section or the energy present in the apparatus capacitively or inductively must be completely spent as losses to stop the section. Energy is consumed in bending losses of the material strip, such as a thin metal strip, in frictions, electric losses of inverters and other corresponding functions.

According to the method of the invention, a fault situation in the supplying mains is detected when the section is operating. Such a fault situation can be caused by a lightning stroke, for example, whereby the supplying mains disappear in its entirety, or faults are caused in it, which makes generation of sufficiently high DC voltage in the DC voltage intermediate circuit 3 difficult or prevents it. The FIGURE shows how a fault situation is detected in connection with the rectifier 2, which sends a signal 9 to the process station 7 about the fault situation of the supplying mains. In connection with the rectifier 2, it is possible to arrange for instance a device determining the voltage or frequency of the mains, which detects that there is an abnormal situation on the mains side. When a fault situation has been detected in the mains, the sectional drive is brought into a mains break deceleration state, whereby there will be no attempts to obtain power from the mains.

In accordance with the invention, a deceleration reference value is formed for the motors in order to stop the motors within a predetermined time after a fault has been detected in the supplying alternating voltage mains. In the FIGURE, the process station 7 is provided with information on the fault, as mentioned previously. A deceleration program has been included in the process station 7 in connection with the mains break. The process station further gives speed reference values or speed sequences to the application controllers 6 for the implementation of the deceleration in a predetermined manner. The estimate T calculated for the deceleration is an estimate of the time required for stopping the motors and, at the same time, the material strip controllably to the zero speed. At first, the motors are controlled in such a way that the stopping is implemented by a linear ramp during the calculated estimate.

Further, in accordance with the invention, the speed of the speed-controlled motors of the sectional drive is controlled on the basis of the deceleration reference value. In the embodiment of the FIGURE, the application controllers control the speed-controlled motors to a desired speed via the inverters 4. The inverters implement the reference values given to them within their own internal control circuits. Since the speed of the motors is decelerated in order to stop the motors, the motors can be caused to function as generators but in a speed-controlled manner.

As mentioned previously, one characteristic of the sectional drive is the control of the tightness of the material strip. Controlling the tightness can be implemented in the simplest way by controlling the motors on the basis of the feedback given by the sensors determining the tightness. Another possibility to implement the tightness control is the determination of the torque directly on the basis of the tightness reference values, utilizing the properties of the inverters and the control means connected thereto.

The FIGURE shows a solution in which sensors 10 are used for determining the tightness, the sensors transmitting information on the tightness to the application controllers 6. The application controllers include information on the set values of the tightness, the values being implemented by controlling torques of the motors via inverters. Typically, the tightness is controlled by adjusting the torque of the successive rollers rotated by a motor in order to achieve the tightness reference value. In such a case, the speed reference value is implemented by a motor drawing the material strip, whereby, in order to achieve the tightness, the material strip must be decelerated by a motor being in the opposite direction to the direction of travel of the material strip.

In accordance with the method of the invention, the torque of the torque-controlled motors of the sectional drive is controlled on the basis of a predetermined tightness reference value. Thus, the tightness reference value remains substantially the same in all situations when the speed of the sectional drive is decelerated. It is obvious, however, that the tightness reference value varies in the longitudinal direction of the sectional drive in the manner determined by the process. In accordance with the basics of ordinary electric machines, an electric machine can function both as a motor and a generator. Thus, in accordance with the control requirements, a motor can function as a motor converting electric energy into mechanical rotation movement or as a generator converting mechanical movement into electric energy.

As mentioned previously, in the deceleration carried out in the normal operating state, the speed of the process section is decelerated by using motors as generators and directing generated voltage back to the supplying mains. Since the mains are not in the operating state during a mains break, it is not possible to decelerate to the mains either. In a normal operating situation, the mains rectifier 2 generates DC voltage in the DC voltage intermediate circuit 3, the intention being to maintain the magnitude of the DC voltage constant. This voltage is determined in normal operation to guarantee the voltage balance. If the voltage exceeds the predetermined value, power is transferred in the direction of the mains, and if the voltage is lower than the predetermined value, the mains rectifier is controlled to produce higher voltage if this is possible within the implementation of the mains rectifier.

In the method according to the invention, the magnitude u of the voltage of the DC voltage intermediate circuit is determined, and this determined magnitude of the DC voltage is compared with a predetermined voltage limit $U_{dc}$. This predetermined voltage limit $U_{dc}$ is preferably the normal intermediate circuit voltage of the inverters 4, i.e. the voltage generated by the mains inverter. As shown in the FIGURE, the measuring information 11 is led to the process station 7, where it is compared with the voltage limit.

If during deceleration of the sectional drive without the supplying mains, the voltage u of the intermediate circuit remains lower than the predetermined voltage limit $U_{dc}$, the deceleration of the motors is to be increased in accordance with the invention. Thus, when the deceleration is increased, the motors are controlled with inverters in such a way that they generate more voltage than before through the inverters of the DC voltage intermediate circuit. If, on the other hand, the voltage of the intermediate circuit rises higher than the predetermined voltage limit, the deceleration is to be decreased, whereby the motors generate voltage lower than before in the DC voltage intermediate circuit. In other words, when the deceleration reference value is a linear ramp, for example, the steepness of the ramp is increased or decreased. In connection with a change in the deceleration reference value, the time required for stopping naturally changes as well.

As described above, the time required for the stopping has been estimated previously, whereby the process station 7 has sent the application controllers 6 instructions to drop the speed to zero. In the process station, the magnitude of the DC voltage intermediate circuit is compared with the predetermined value in the way described above, whereby the process station forms new speed reference values for the application controllers, which reference values take into account the magnitude of the voltage formed in the DC voltage intermediate circuit. Thus, the process station adjusts the voltage of the DC voltage intermediate circuit at the upper level, using the speed reference value of the motors as the controlled variable.

Maintaining the DC voltage intermediate circuit at the desired level is necessary for the implementation of the method according to the invention and for successful mains break deceleration, because controlling the tightness of the material strip in sectional drive is not possible without intermediate circuit voltage. It is to be noted that in the method according to the invention the tightness of the material strip is continuously adjusted in a desired manner in such a way that the material strip will not break. Further, the speed of the material strip is controlled in such a way that the motors are decelerated in a regenerative manner to maintain the DC voltage in the DC voltage intermediate circuit. When the DC voltage in the intermediate circuit 3 is successfully maintained at the constant value, the electric power generated by the motors is equal to the losses of the sectional drive.

When moving on to the mains break deceleration state, there is a delay between the real breaking of the mains and the starting of the deceleration. This delay is due to the measuring, data transfer and software delays. However, the overall delay is not so long that the tightness of the strip would change, because sufficiently energy has been stored in the electric circuits of the large sectional drive to manage the process during the change.

It is to be noted that although the invention has been described with reference to a metal further-processing plant, it can also be applied to other sectional drives within the scope of the claims. It will be obvious to a person skilled in the art that with the advance of technology the basic idea of the invention can be implemented in a plurality of ways. The invention and its embodiments are thus not limited to the above-described examples but can vary within the scope of the claims.

What is claimed is:

1. A method for stopping sectional drive controllably in connection with a fault situation in the supplying mains, the sectional drive comprising a plurality of inverters which are supplied by a DC voltage intermediate circuit supplied by the mains, a plurality of electric motors which are controlled by the inverters with speed and/or torque control and which are used for implementing speed and tightness reference values of the strip in the sectional drive, the tightness reference value being predetermined motor-specifically or motor-group-specifically, the method comprising, before stopping the sectional drive, an implementing step in which an estimate (T) of the time needed for stopping the sectional drive motors is determined, whereby the method comprises, in connection with a fault situation in the mains, the steps of detecting a fault situation in the supplying mains;

forming a deceleration reference value for the motors for stopping the motors within a predetermined time;

controlling the speed of the speed-controlled sectional drive motors on the basis of the deceleration reference value;

controlling the torque of the torque-controlled sectional drive motors on the basis of a predetermined tightness reference value;

determining the magnitude (u) of the DC voltage of the DC voltage intermediate circuit;

comparing the magnitude (u) of the DC voltage with a predetermined voltage limit ($U_{dc}$); and altering the deceleration reference value on the basis of the magnitude of the DC voltage in such a way that when the determined DC voltage (u) is lower than the voltage limit ($U_{dc}$), the deceleration of the motors is increased, or in such a way that when the DC voltage (u) is higher than the voltage limit ($U_{dc}$), the deceleration is decreased to stop the sectional drive in a controllable manner, maintaining the tightness reference value of the strip.

2. A method according to claim 1, the method comprising, before stopping the sectional drive, the steps of predetermining the time estimate needed to stop the sectional drive at one or more operation points of the sectional drive, whereby the method further comprises in connection with a fault situation of the mains the step of selecting the time estimate (T) to be used from one or more time estimates on the basis of the operation point of the sectional drive.

3. A method according to claim 1, wherein the formation of the deceleration reference value comprises the step of forming a speed reference value that decreases to zero within a predetermined time (T).

4. A method according to claim 1, wherein changing of the deceleration reference value, which depends on the magnitude of the DC voltage, comprises the step of changing the angular coefficient, i.e. deceleration, of the speed reference value decreasing to zero.

5. A method according to claim 1, the method further comprising, after the detection of a fault situation in the supplying mains, the step of using energy stored in the electric circuits of the sectional drive for management of the sectional drive during delays before controlling the speed of the motors.

6. An arrangement for stopping sectional drive controllably in connection with a fault situation of the supplying mains, the sectional drive comprising a plurality of inverters that receive their supply from a DC voltage intermediate circuit supplied by the mains, a plurality of electric motors that are controlled with inverters in a speed-controlled or torque-controlled manner and that are used for implementing the speed reference value and tightness reference value of the strip of the sectional drive, whereby the tightness reference value is predetermined motor-specifically or motor-group-specifically, comprising:

means for detecting a fault situation in the mains;

first control means for controlling the speed of the speed-controlled motors;

second control means for controlling the torque of the torque-controlled motors on the basis of a predetermined tightness reference value;

a voltage-measuring member in order to determine the DC voltage of the DC voltage intermediate circuit;

tightness-determining means arranged to determine the tightness of the material strip of the sectional drive; and a memory and processing member arranged to store the estimate (T) of the time needed for stopping the motors of the sectional drive, to form a deceleration reference value for the motors for stopping the motors within a predetermined time, to compare the magnitude of the DC voltage with a predetermined voltage limit, and to alter the deceleration reference value, depending on the magnitude of the DC voltage.

7. An arrangement according to claim 6, wherein the tightness-determining means comprise a tightness-determining sensor.

8. An arrangement according to claim 6, wherein the second control means is arranged to function as tightness-determining means, whereby the torque reference values controlling the motors are determined on the basis of the tightness reference values.

9. An arrangement according to claim 6, wherein the first and second control means are application controllers and the memory and processing member is a process station.

* * * * *